United States Patent

Giordano et al.

[11] Patent Number: 5,572,729
[45] Date of Patent: *Nov. 5, 1996

[54] METHOD FOR STATELESS RENAME PROPAGATION BETWEEN HIERARCHICAL FILE NAME SPACES

[75] Inventors: Claeton J. Giordano, Menlo Park; Evan W. Adams, San Leandro, both of Calif.

[73] Assignee: Sun Microsystems, Inc., Mountain View, Calif.

[*] Notice: The term of this patent shall not extend beyond the expiration date of Pat. No. 5,257,680.

[21] Appl. No.: 180,041

[22] Filed: Jan. 11, 1994

[51] Int. Cl.$^6$ .................................................. G06F 15/16
[52] U.S. Cl. ............... 395/616; 364/222.81; 364/222.82; 364/282.4; 364/DIG. 1
[58] Field of Search ........................... 395/600, 200, 395/650, 425, 575, 600, 650; 364/222.81, 282.4

[56] References Cited

U.S. PATENT DOCUMENTS

| | | | |
|---|---|---|---|
| 4,558,413 | 12/1985 | Schmidt et al. | 395/600 |
| 5,151,989 | 9/1992 | Johnson et al. | 395/600 |
| 5,237,680 | 8/1993 | Adams et al. | 395/600 |
| 5,239,640 | 8/1993 | Froemke et al. | 395/180 |
| 5,239,647 | 8/1993 | Anglin et al. | 395/600 |
| 5,261,051 | 11/1993 | Masden et al. | 395/200 |
| 5,301,286 | 4/1994 | Rajani | 395/400 |
| 5,333,315 | 7/1994 | Saether | 395/600 |
| 5,355,453 | 10/1994 | Row et al. | 395/200 |

OTHER PUBLICATIONS

IEEE Standard Computer Dictionary: A Compilation of IEEE Standard Computer Glossaries, Jan. 18, 1991.

Primary Examiner—Thomas G. Black
Assistant Examiner—Hosain T. Alam
Attorney, Agent, or Firm—Blakely Sokoloff Taylor & Zafman

[57] ABSTRACT

A method for the stateless propagation of rename's between hierarchial file name spaces is provided. Under the method any standard rename command may be used on a filename located in a local file system name space (FSNS). Thereafter, when a file is renamed, that rename may be propagated through the use of three steps. First, when files have been renamed in either the local, remote or both FSNS, the filenames in the local FSNS must be matched with the corresponding file names in the remote FSNS. Then, after a match has been made, the current rename state is determined to see if the file was renamed in either, both or neither FSNS, or to see of the filename describes a new file not found in the other FSNS. Finally, after the name history for each file in both the local and remote FSNS's are updated, a propagation can occur which updates any changed file names in the remote FSNS, and also updates the entries in the remote FSNS name table and the local FSNS name table to reflect any such changes. In this way file name changes may be made without the need for a user to execute a special rename command.

6 Claims, 4 Drawing Sheets

METHOD FOR STATELESS RENAME PROPAGATION BETWEEN HIERARCHICAL FILE NAME SPACES

BACKGROUND OF THE INVENTION

1. Field of the Invention

This invention relates, in general, to the field of software development environments and, more particularly, to tools for the propagation of file name changes between two File System Name Spaces (FSNS) which are at least temporarily related in a "local"/"remote" configuration.

2. Background

As the development of more complex and powerful software continues in the wake of increased computer processing power, and the demand by users for software which can fully utilize this power, it has become clear that sophisticated computer programs can generally no longer be written by an individual programmer working alone. Instead, teams of software developers are often assembled with the responsibility for developing individual software modules, using the latest modular programming language, falling on individual team members.

Unfortunately, one problem with this "team" development model of software is that due to the modular nature of current software development languages, the work of one developer will have a direct effect on the operation of another developers code. Therefore, rather than having individual programmers work alone, and in parallel, trying to successfully combine their efforts at the end of the development process, "team" oriented software development tools, and a team oriented environments, have been created to optimize the development process, minimize conflicts and maximize the use of common routines.

A difficulty which arises in such a team environment, however, is that frequently each developer will have a computer directory where he or she maintains the files being worked on. In addition, there is usually a global, or group, directory where files which are available to the entire development team, are stored. By maintaining separate file systems increased flexibility is provided to each developer and to the group as a whole. However, since the file systems are separate, a mechanism must be included to propagate, when desired, file changes from a local file directory to the global, or remote, file directory, and vice versa. The difficulty this presents is that if a rename command has been executed in One such solution to the problem of tracking file renames is disclosed in U.S. Pat. No. 5,237,680, issued on Aug. 17, 1993 and assigned to Sun Microsystems, Inc. of Mountain View, Calif., for a "Method For Incremental Rename Propagation Between Hierarchical File Name Spaces." The teachings of this patent are incorporated herein by reference.

While the teachings of the '680 patent indeed manage the propagation of renames between a local FSNS and a remote FSNS, two deficiencies are noted. First, under the prior art it is required that chances to the FSNS (using renames) be initiated via a special "rename command". Renames initiated via any other method (such as the operating systems native rename facility) will cause the system to fail. Second, for the purposes of propagating renames between two FSNS, they are related such that one is considered the "remote" FSNS and the other the "local" FSNS. This relationship is established when the local FSNS is created from the remote FSNS and, under the prior art, is required to be permanent. This means that once a FSNS is created from a remote FSNS, it can not establish a new local/remote relationship with a different remote FSNS.

Therefore, it has been determined that the need exists for an improved method for the stateless propagation of renames between hierarchial file system name spaces which overcomes the aforenoted limitations.

SUMMARY OF THE INVENTION

A method for propagating rile renames between a local File System Name Space (FSNS) and a remote FSNS is disclosed which is accomplished in three steps, a "matching" step, a "rename state determination" step and a "rename propagation" step.

During the matching step when files have been renamed in either or both of the local FSNS and the remote FSNS, then the filenames in the local FSNS are matched with the corresponding file names in the remote FSNS. Each FSNS contains a nametable which is used to match filenames. The nametable is defined as a file consisting of a set of records, one per file in the FSNS. Each record contains the file's name and a unique checksum which is a number that can be computed from the file and is unique for each file in a FSNS. A file's checksum remains the same in all FSNS's. When a file's name is changed, the new name is recorded in the nametable when it propagates between a local and a remote FSNS. Using the method of the invention, even if the names of the files in the nametable are incorrect, a correct rename transaction will occur.

Subsequent to the matching step, the rename state of each filename is then determined. Based upon this determination it will be possible that:

1. The filename was not renamed in either FSNS; or
2. The filename was renamed in only the local FSNS; or
3. The filename was renamed in only the remote FSNS; or
4. The filename was renamed in both the local and remote FSNS; or
5. The filename is new in one of the FSNS's and does not exist in the other FSNS under any name.

A name history is provided to determine the rename state. The name history is a directed acyclic graph (DAG) of the names a given file has had. Since the new name of a file is appended to the name history record associated with each filename when it is propagated between a local and remote FSNS, by using this rename determination process each file will then contain a history of all the names a file has had.

Finally, after completing the rename state determination step, the rename can then be safely propagated with the nametables in both the local FSNS and the remote FSNS being updated to reflect the rename.

NOTATION AND NOMENCLATURE

Figure 1:
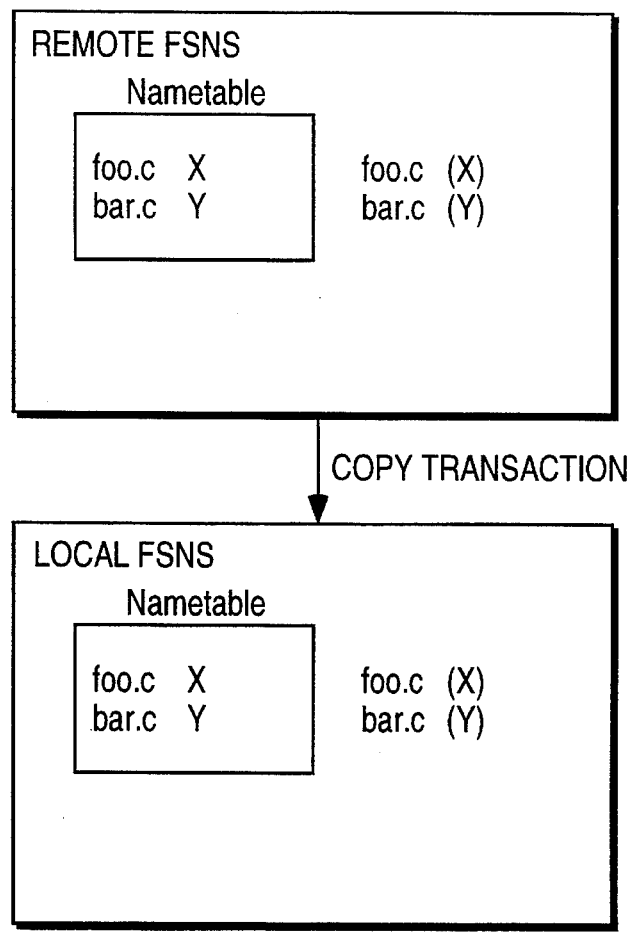
FIG. 1 illustrates the contents of both a remote FSNS and a local FSNS after a "copy transaction" step has been executed.

The detailed description that follows is presented largely in terms of algorithms and symbolic representations of operations on data bits and data structures within a computer memory. These algorithmic descriptions and representations are the means used by those skilled in the data processing arts to most effectively convey in substance their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic; signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

The stateless rename propagation mechanism of the present invention is embodied in the SPACRworks/TeamWare software development system distributed by the SunPro division of Sun Microsystems, Inc. of Mountain View, Calif. The invention renames files in a distributed database transparently whenever users modify files in their own private environments.

Figure 6:
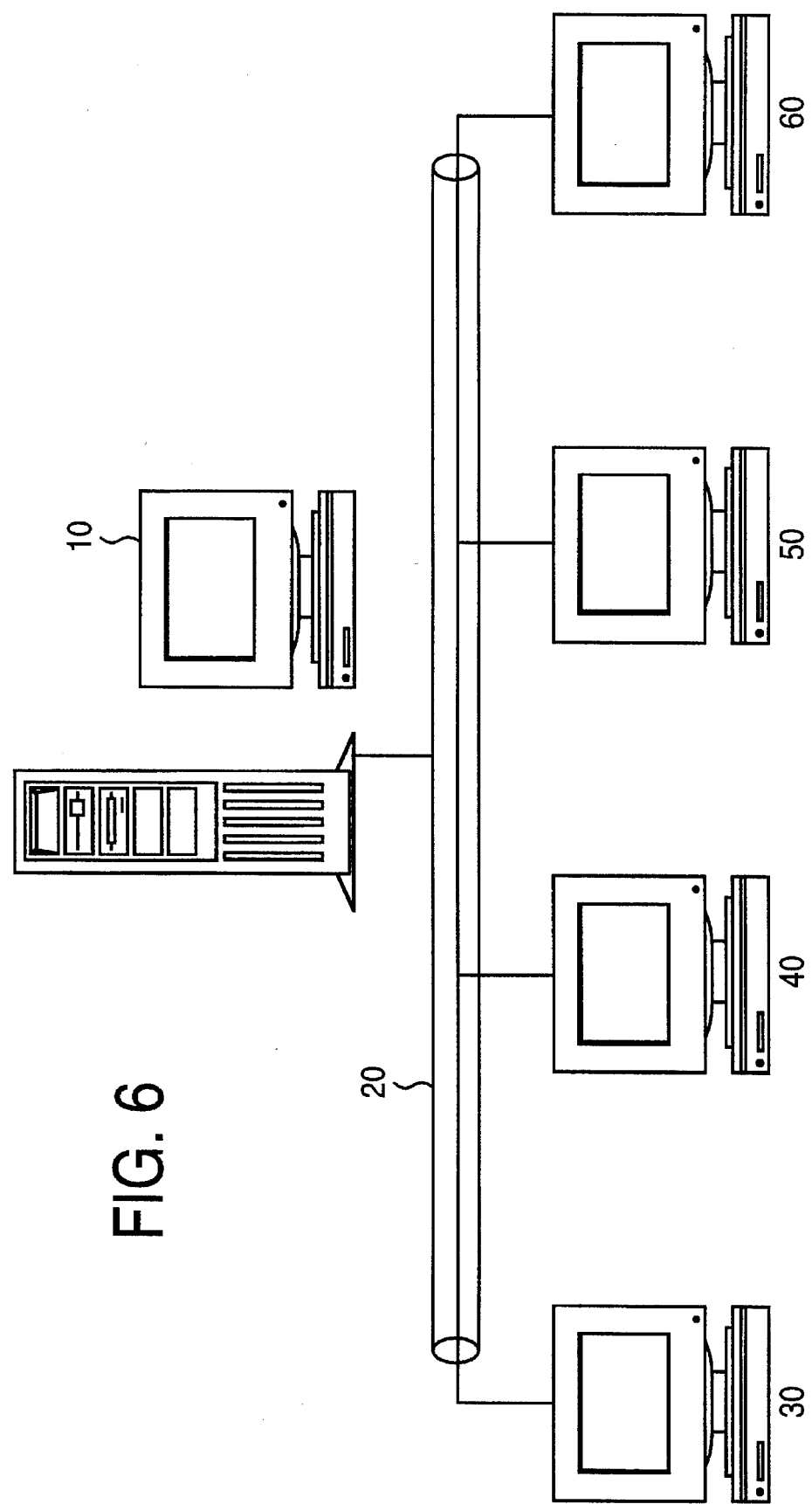
FIG. 6 is a system diagram which illustrates a team software development environment in which the instant invention may be practiced.

Such a system can be seen in FIG. 6. As illustrated, a software development team simultaneously working on the same project may be connected to a server 10 across a local area network 20. Each software developer will have his or her own workstation, designated by units 30-60, with such workstations being of the type such as the SUN Microsystems SPARC workstation or MicroSPARC II workstation. Since these workstations are networked they may have local file storage (which may or may not be physically local to the workstation) and will also have access, if authorized, to shared file resources which may be accessed through the file server 10. In a preferred configuration each workstation 30-60 will have its own file system and associated file system name space, which may be considered the local file system name space. In addition, the server will preferably be configured to have its own file system and file system name space which will be considered remote from the file system name space of the workstations.

Turning to FIG. 1, we see a remote file system name space (FSNS) and a local FSNS. Each FSNS contains files and a nametable. In FIG. 1, the remote FSNS contains two files, foo.c and bar.c, and their respective checksums (X) and (Y). In addition the remote FSNS also contains a nametable which further contains two fields per record; a file name (here, also foo.c and bar.c) and the unique checksum.

In order to begin the propagation of a file rename command, three tasks must be accomplished. First, the nametables in both the remote FSNS and the local FSNS are used to match filenames. Then, once a filename from a local FSNS has been matched with a filename from the remote FSNS, the rename state must be determined. Finally, once the rename state is determined, any required propagation of the rename can take place.

As seen in FIG. 1, a remote FSNS has two files, foo.c (with a checksum of 'X') and bar.c (with a checksum of 'Y'). Using the nametable for matching, the first step is to copy the remote FSNS to create a local FSNS. This copy transaction is indicated by the arrow between the two FSNS's and copies the entries in the remote FSNS's name table to create the local FSNS's nametable. After completing the copy transaction the remote and local FSNS's are identical.

Figure 2:
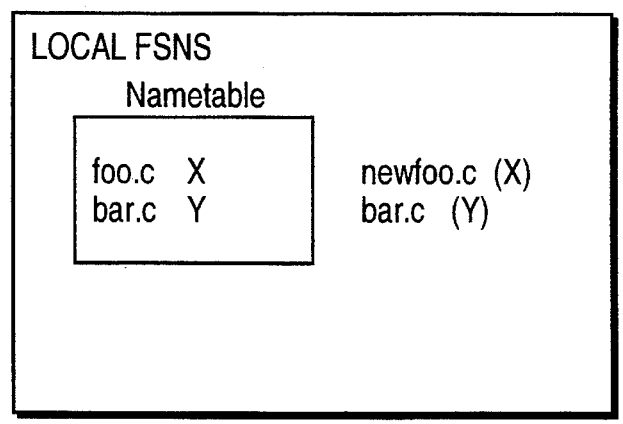
FIG. 2 illustrates the contents of a local FSNS after a file has been locally renamed.

Turning next to FIG. 2, a local rename of the file foo.c to newfoo.c is shown. While this rename can be accomplished through any appropriate command available in the native operating system, under the UNIX operating system such a rename would be accomplished through the use of the "mv" command. In addition, unlike the prior art approach, under the preferred embodiment it is not necessary to use a special rename command. Renames do not need to be reported to the propagation facility at the time they are performed. The prior art placed limitations on the renames which could be propagated as it could not handle renames performed by programs which did not use the special rename command (such as UNIX shell scripts), or renames performed by users who elected not to use the special rename command.

As shown in FIG. 2, while the name of the file foo.c has been changed to newfoo.c, the names of the files in the local FSNS and those in the local FSNS's nametable do not correspond, as the nametable entry still refers to foo.c. While this mismatch is noted at this point, it will not be corrected until after the propagation of the rename from the local FSNS to the remote FSNS.

Figure 3:
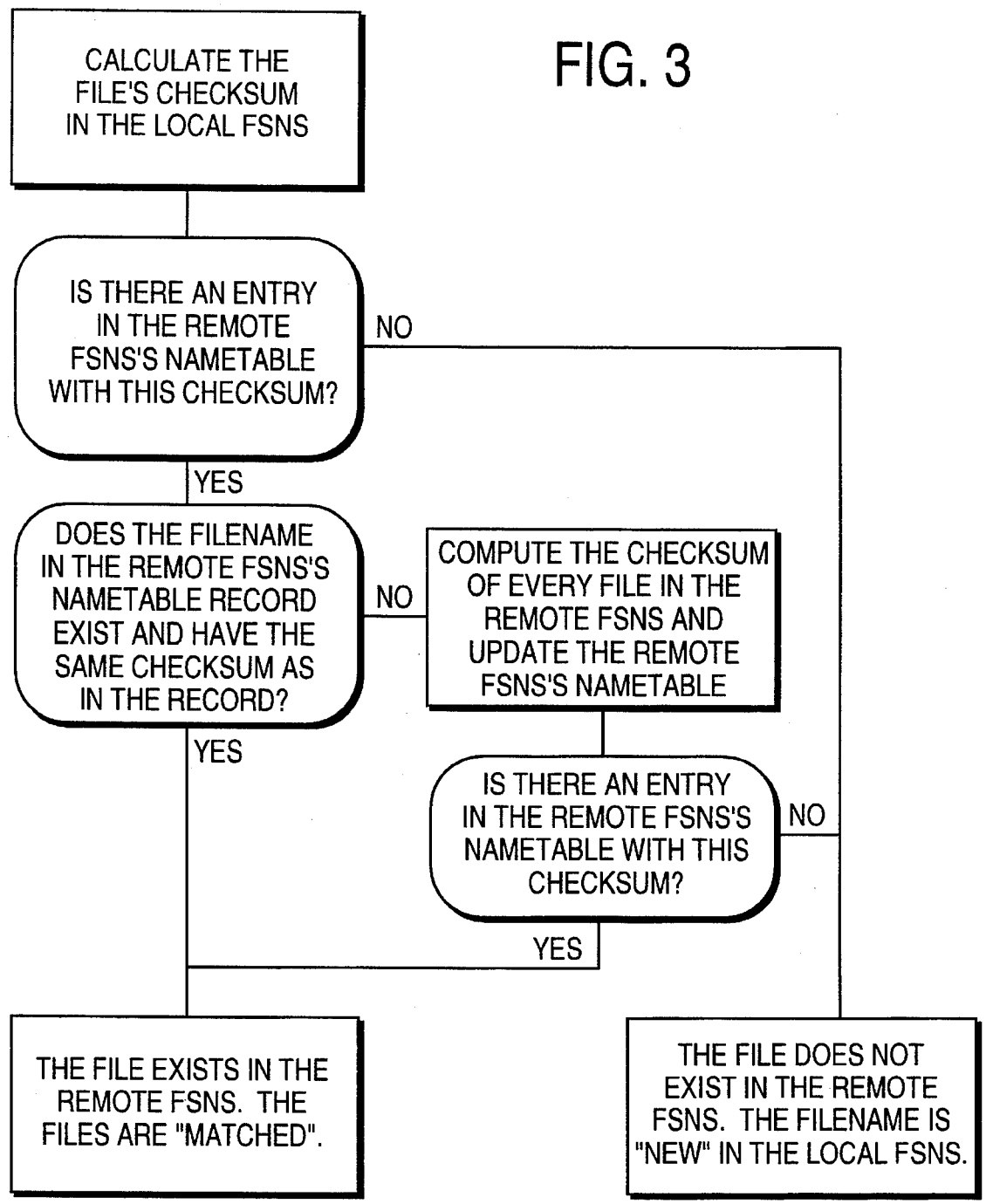
FIG. 3 is a flow diagram illustrating the method of the instant invention.

Turning next to FIG. 3, a flowchart showing the next step in the matching process is provided. As can be seen, in order to propagate the renames from the local FSNS to the remote FSNS, first, each filename in the local FSNS must be matched with the corresponding filename in the remote FSNS. Therefore for each filename in the local FSNS the following flowchart steps are performed.

First, a calculation is performed of the checksum for each file in the local FSNS. As noted above, each checksum is unique and does not change for a file, even if the file has undergone a rename. After the checksums are calculated, the process checks whether there is an entry in the remote FSNS's nametable with the same checksum(s). If there is not, then we can conclude that the file in the local FSNS does not exist in the remote FSNS, and there must be a newly created file in the local FSNS.

However if there is a matching checksum in the remote FSNS's nametable, then the next step is to check whether the filename in the remote FSNS's nametable record actually exists as a file (and not just as an entry in the nametable), and if so, does the file itself have the same checksum as in the record. In this case, if the filename does exist, and also has the same checksum, then we can conclude that the renamed file actually exists (albeit possibly under its old name) in the remote FSNS and thus is considered matched.

On the other hand, if there is an entry in the remote FSNS's nametable with the requested checksum, but the actual filename does not exist in the remote FSNS (or the filename matches but there is a mismatch for the checksum, indicating the possibility of a different file which happens to have the same name), then the next step is to compute the checksum of every file in the remote FSNS and then update the entries in the remote FSNS's nametable. After performing this update, a check is again made for an entry in the remote FSNS's nametable with the recalculated checksum. If such an entry is found, then we can conclude that the file exists in the remote FSNS, and there is, once again, a match. However, if after recalculation of checksums, there is no entry in the remote FSNS's nametable with the recalculated checksum, then we assume that there is no match, and the file does not exist in the remote FSNS.

Once a filename from a local FSNS has been matched with a filename from the remote FSNS, the rename state must be determined. It is, at this point, known that the file exists in both FSNS's, so it cannot be a "new" file in either FSNS. Therefore, the next step is to determine the rename state by reviewing the filename history tables in each FSNS.

Figure 4:
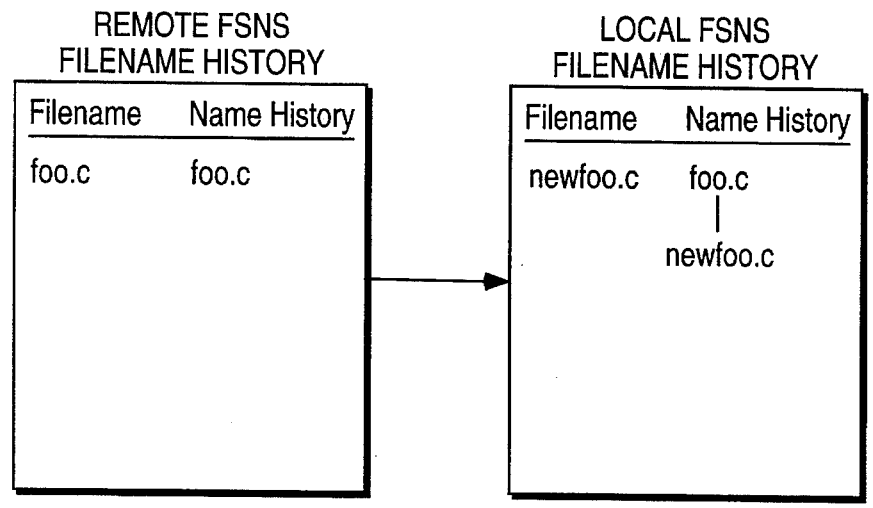
FIG. 4 illustrates the contents of a remote FSNS and a local FSNS filename history table.

As shown in FIG. 4, the version of each file includes a name history which is used to determine the rename state. The name history is a directed acyclic graph (DAG) of the names a given file (uniquely identified by its checksum) has had. The rename state is determined by comparing the DAG's. If the current name in both the local FSNS and the remote FSNS is the same, then the file has not been renamed. However, as shown in FIG. 4, if one graph is a superset of the other, then the FSNS containing the superset graph contains the rename. This is the case of the example shown in FIG. 4, where the DAG in the local FSNS is a superset of the DAG in the remote FSNS. On the other hand, if both graphs contain nodes that are not in the other graph, then we can conclude that a given filename has been renamed in both FSNS's.

In FIG. 4, the name history of foo.c begins with being located at just one node; on the remote FSNS as foo.c. During the initial copy transaction, as shown in FIG. 1, this history is copied from the remote FSNS to the local FSNS. Then, after being co-located to the local FSNS, the file foo.c is renamed to newfoo.c in the local FSNS. The name history in the local FSNS is not updated at the time of the actual rename (or mv) command, but is updated at the time of the next transaction. So the transaction to propagate the changes from the local FSNS to the remote FSNS updates newfoo.c's entry in the name history in the local FSNS. The result is shown in FIG. 4, where it can be seen that the name history for the file newfoo.c has two entries; foo.c and new foo.c. As noted above, since the name history for the filename in the local FSNS is a superset of the one for the filename in the remote FSNS, the rename state indicates that the file newfoo.c was renamed in the local FSNS.

Figure 5:
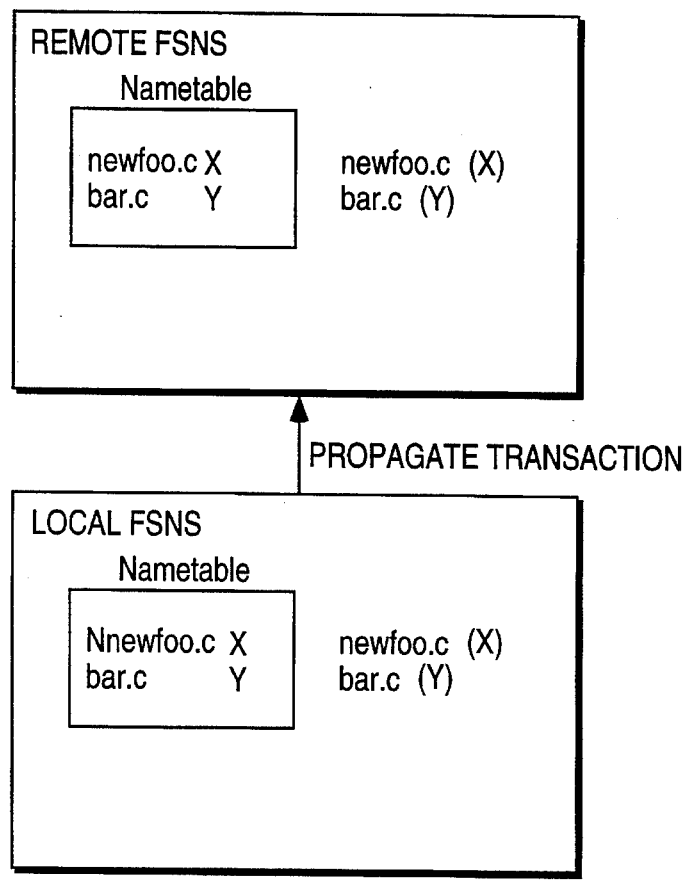
FIG. 5 illustrates the contents of both a remote FSNS and a local FSNS after a "propagate transaction" step has been executed.

Since it is now known that the filename foo.c in the remote FSNS corresponds to (or matches) the filename newfoo.c in the local FSNS and that there was a rename in the local FSNS, the next step is to propagate the rename from the local FSNS to the remote FSNS. This rename is propagated to the remote FSNS by rename the file foo.c to newfoo.c in the remote FSNS. At this time the nametable in the remote FSNS is updated to reflect this rename. In addition, the nametable in the local FSNS is also updated. The results are illustrated in FIG. 5, where both the filename in the FSNS and the filename in the name table are matched to the newly renamed newfoo.c, thus completing the rename propagation.

As noted earlier, the prior art requires that changes to the FSNS be initiated via a special "rename" command, since renames initiated by any other method will cause the system to fail. However, under the teachings of the instant invention, the system does not have to be notified when a file's name changes in a FSNS. Rather, the system gathers the necessary name and rename information at the time that transactions are performed between FSNS's. In this way filenames may be changed within a FSNS using any method.

In addition, for the purposes of propagating renames between two FSNS, they are considered to be related such that one is considered the "remote" FSNS, while the other is considered the "local" FSNS. This relationship is created from the remote FSNS. As noted above, in the prior art the relationship between the remote FSNS and the local FSNS is permanent, and once a FSNS is created from a remote FSNS, it can not establish a new local/remote relationship with a different FSNS. On the other hand, using the teachings of the instant invention, renames may be propagated between any two FSNS. Each transaction between two FSNS's recomputes the rename state for all files involved. Each FSNS also records information about the files within that FSNS only, that is, the FSNS nametable and each file's name history. Information about one FSNS is not recorded in another FSNS as doing so would prevent the propagation of rename information to arbitrary FSNS. Therefore, in this way, multiple local and multiple remote sites can flexibly propagate file name changes, providing increased productivity and a decreased chance for confusion regarding the current name and state of a particular file.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are, accordingly, to be regarded as illustrative, rather than in a restrictive sense.

What is claimed is:

1. A method for the propagation of a renamed filename from a first file system name space (FSNS) to a second FSNS, the method comprising the steps of:

matching the files, in the first FSNS, which have been renamed with those files, in the second FSNS, having the same checksum, wherein the checksum uniquely identifies each file regardless of its current name;

determining a rename state for each matched file of the first and second FSNS; and propagating the renamed filename from the first FSNS to the second FSNS for each matched file for which the renamed filename has not already been propagated.

2. The method, as claimed in claim 1, wherein the step of determining the rename state further comprises the steps of:

examining a name history of each file in the first FSNS and the second FSNS;

comparing the name histories of matching filenames in the first and second FSNS's;

determining, for each matching filename, whether the corresponding name history is a superset or a subset of the other matching filename name history; and determining that the FSNS in which the name history is a superset of the other FSNS is the FSNS in which the rename took place.

3. The method, as claimed in claim 1, wherein the step of propagating the renamed filename for matched files further comprises the steps of:

renaming the propagated file in the second FSNS with the corresponding renamed filename from the first FSNS;

updating the nametable of the second FSNS; and updating a nametable of the first FSNS.

4. The method, as claimed in claim 1, wherein said step for matching the files further comprises the steps of:

calculating a checksum for each file in the first FSNS;

determining whether there is an entry in a nametable of the second FSNS having the same checksum;

if no entry with the same checksum exists in the nametable of the second FSNS, determining that the file in the first FSNS is a new file;

if there is an entry in the nametable of the second FSNS with the same checksum, determining whether a file having the same filename as the entry in the nametable of the second FSNS actually exists in the second FSNS and whether this file has the same checksum as the entry in the nametable of the second FSNS;

if the entry in the second FSNS does have the same checksum but no file with the same filename as the entry in the nametable of the second FSNS exists in the second FSNS, or a file with the same filename as the entry in the nametable of the second FSNS exists in the second FSNS but such file has a different checksum, computing the checksum of every file in the second FSNS and updating the nametable of the second FSNS;

determining, after updating the nametable of the second FSNS, if there is an entry in the nametable of the second FSNS with the same checksum;

if after updating the nametable of the second FSNS there is no entry in the nametable of the second FSNS with the same checksum, determining that the file in the first FSNS is a new file; and if after updating the second FSNS nametable there is a filename in the second FSNS nametable with the same checksum, determining that the file already exists in the second FSNS.

5. An apparatus for propagating a file rename, comprising:

a first file system name space (FSNS);

a second file system name space (FSNS);

a naming mechanism coupled to said first and second FSNS for associating a name with each file in each of said first and second FSNS, said naming mechanism for selectively renaming a file in each of said first and second FSNS which has previously been named;

a matching mechanism coupled to said matching mechanism for matching those files in said first FSNS which have been renamed with those files having corresponding file names in the second FSNS; and a state determination mechanism coupled to said matching mechanism for determining the rename state for each file indicated as being matched by said matching mechanism;

whereby a file rename is propagated from said first FSNS to said second FSNS when said matching mechanism indicates matched files in said first FSNS and said second FSNS and said matched file in said second FSNS has not already been renamed.

6. A multi-user computer system, comprising:

a first user workstation, said first user workstation including a first file system, said first file system including a first file system name space; and a system file server coupled to said first user workstation, said system file server including a server file system, said server file system including a server file name space, said system file server comprising a naming mechanism for associating a name with each file in said first file system and said server file system, said naming mechanism renaming a file in said first file system name space and said server file name space which have previously been named when a predetermined condition has been met; a matching mechanism for matching those files in said first file system name space which have been renamed with those files having corresponding file names in said server file system name space; and a state determination mechanism for determining the rename state for each file indicated as being matched by said matching mechanism;

whereby a file rename is propagated from said first file system name space to said server file system name space when said matching mechanism indicates matched files in said first file system name space and said server file system name space, and said matched file in said server file system name space has not already been renamed.

* * * * *